(12) United States Patent
Joyce et al.

(10) Patent No.: US 9,027,989 B1
(45) Date of Patent: May 12, 2015

(54) EXTRUDED BODY COMPONENT WITH NOTCHED FLANGE TO REDUCE STRAIN IN BENDING

(71) Applicant: Ford Global Technologies, LLC, Dearborn, MI (US)

(72) Inventors: John Joyce, Ypsilanti, MI (US); Darrin Neil Wagner, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/076,746

(22) Filed: Nov. 11, 2013

Related U.S. Application Data

(63) Continuation-in-part of application No. 14/062,510, filed on Oct. 24, 2013, and a continuation-in-part of application No. 14/062,568, filed on Oct. 24, 2013.

(51) Int. Cl.
*B60R 13/07* (2006.01)
*B62D 25/06* (2006.01)

(52) U.S. Cl.
CPC ........................... *B62D 25/06* (2013.01)

(58) Field of Classification Search
CPC ............... B60G 2206/012; B60G 21/0551; B60G 2200/144; B60G 2204/82; H01L 2924/0002; B21D 13/04; C08L 2666/14
USPC .............. 296/210; 280/748, 781, 785, 796; 29/897.2
See application file for complete search history.

(56) References Cited

U.S. PATENT DOCUMENTS

| | | | | |
|---|---|---|---|---|
| 3,132,891 A | * | 5/1964 | Pyuro et al. | 296/204 |
| 3,326,599 A | * | 6/1967 | Pashenee | 296/210 |
| 3,526,426 A | * | 9/1970 | Wessells | 296/96.21 |
| 4,252,364 A | * | 2/1981 | Toyama et al. | 296/203.01 |

(Continued)

FOREIGN PATENT DOCUMENTS

| | | |
|---|---|---|
| DE | 10336901 B3 | 5/2005 |
| EP | 1759960 A2 | 3/2007 |

(Continued)

OTHER PUBLICATIONS

"Rugged Ridge Extruded Aluminum Windshield Header (2 & 4 Door JK 2007-2013)," printed May 24, 2013, http://www.fueled4wd.com/Rugged_Ridge_Windshield_Header_p/frr-13308.05.htm, 4 pages.

(Continued)

*Primary Examiner* — Kiran B Patel
(74) *Attorney, Agent, or Firm* — Raymond Coppiellie Price Heneveld LLP

(57) ABSTRACT

A vehicular system is provided with a substantially hollow member having a long axis, a short axis, and an outer surface substantially parallel to the long axis. The outer surface includes a plurality of notched elements configured to reduce strain from bending the member in the direction of the short axis, e.g., by a stretch bending process. The hollow member may also include an outer surface that is curved substantially in the direction of the short axis. A method of making the vehicular assembly includes the steps: providing a substantially hollow member having a long axis, a short axis, and an outer surface substantially parallel to the long axis; cutting a plurality of notched elements into the outer surface; and bending the member such that the portion of the outer surface in proximity to the notched elements is in tension and curved in the short axis direction.

4 Claims, 5 Drawing Sheets

(56) References Cited

U.S. PATENT DOCUMENTS

| | | | |
|---|---|---|---|
| 5,018,781 A * | 5/1991 | Kumasaka et al. | 296/210 |
| 5,048,887 A * | 9/1991 | Tetuo et al. | 296/146.9 |
| 5,096,254 A * | 3/1992 | Sparke | 296/193.06 |
| 6,065,261 A | 5/2000 | Fehr et al. | |
| 6,116,680 A | 9/2000 | Hunter et al. | |
| 6,325,450 B2 * | 12/2001 | Sakyo et al. | 296/190.08 |
| 6,499,798 B2 * | 12/2002 | Takemoto | 296/203.02 |
| 6,557,930 B1 | 5/2003 | Bruggemann et al. | |
| 6,584,689 B2 | 7/2003 | Bruggemann et al. | |
| 6,616,221 B2 * | 9/2003 | Lumpe et al. | 296/210 |
| 6,758,511 B2 * | 7/2004 | Taylor et al. | 296/121 |
| 6,869,135 B2 | 3/2005 | Forssell | |
| 6,929,312 B2 * | 8/2005 | Rich et al. | 296/187.02 |
| 7,077,462 B1 * | 7/2006 | De Gaillard | 296/216.01 |
| 7,506,911 B2 * | 3/2009 | Lee | 296/96.21 |
| 7,543,883 B2 * | 6/2009 | Chen et al. | 296/203.03 |
| 7,699,386 B2 | 4/2010 | Fukumoto | |
| 7,914,072 B2 * | 3/2011 | Queener et al. | 296/210 |
| 8,246,109 B2 | 8/2012 | Wykoff et al. | |
| 8,641,133 B1 * | 2/2014 | Scaringe et al. | 296/193.03 |
| 8,651,566 B2 * | 2/2014 | Nakaaki | 296/210 |
| 8,746,787 B2 * | 6/2014 | Adamski | 296/210 |
| 2009/0033128 A1 * | 2/2009 | Hoelzel | 296/216.01 |
| 2010/0038932 A1 * | 2/2010 | Comfort et al. | 296/216.08 |
| 2012/0104803 A1 * | 5/2012 | Thomas et al. | 296/203.01 |
| 2013/0026779 A1 * | 1/2013 | Kuroki et al. | 296/96.21 |
| 2013/0082484 A1 | 4/2013 | Wagner et al. | |
| 2013/0181487 A1 * | 7/2013 | Krueger et al. | 296/210 |
| 2013/0200657 A1 * | 8/2013 | Shirai | 296/210 |
| 2014/0008940 A1 | 1/2014 | Adamski et al. | |
| 2014/0123495 A1 * | 5/2014 | Hill et al. | 29/897.2 |
| 2014/0138988 A1 * | 5/2014 | Kisaku et al. | 296/210 |
| 2014/0217783 A1 * | 8/2014 | Hida et al. | 296/210 |

FOREIGN PATENT DOCUMENTS

| | | |
|---|---|---|
| GB | 639911 | 7/1950 |
| JP | 2006240420 A | 9/2006 |
| JP | 2009113690 A | 5/2009 |
| JP | 2010013021 A | 1/2010 |
| JP | 2011136623 A | 7/2011 |
| JP | 2012081878 A | 4/2012 |

OTHER PUBLICATIONS

"National Code of Practice for Light Vehicle Construction and Modification," Vehicle Standards Bulletin 14, Section LH Body and Chassis, Jan. 2011, 73 pages, Version 2.0.

* cited by examiner

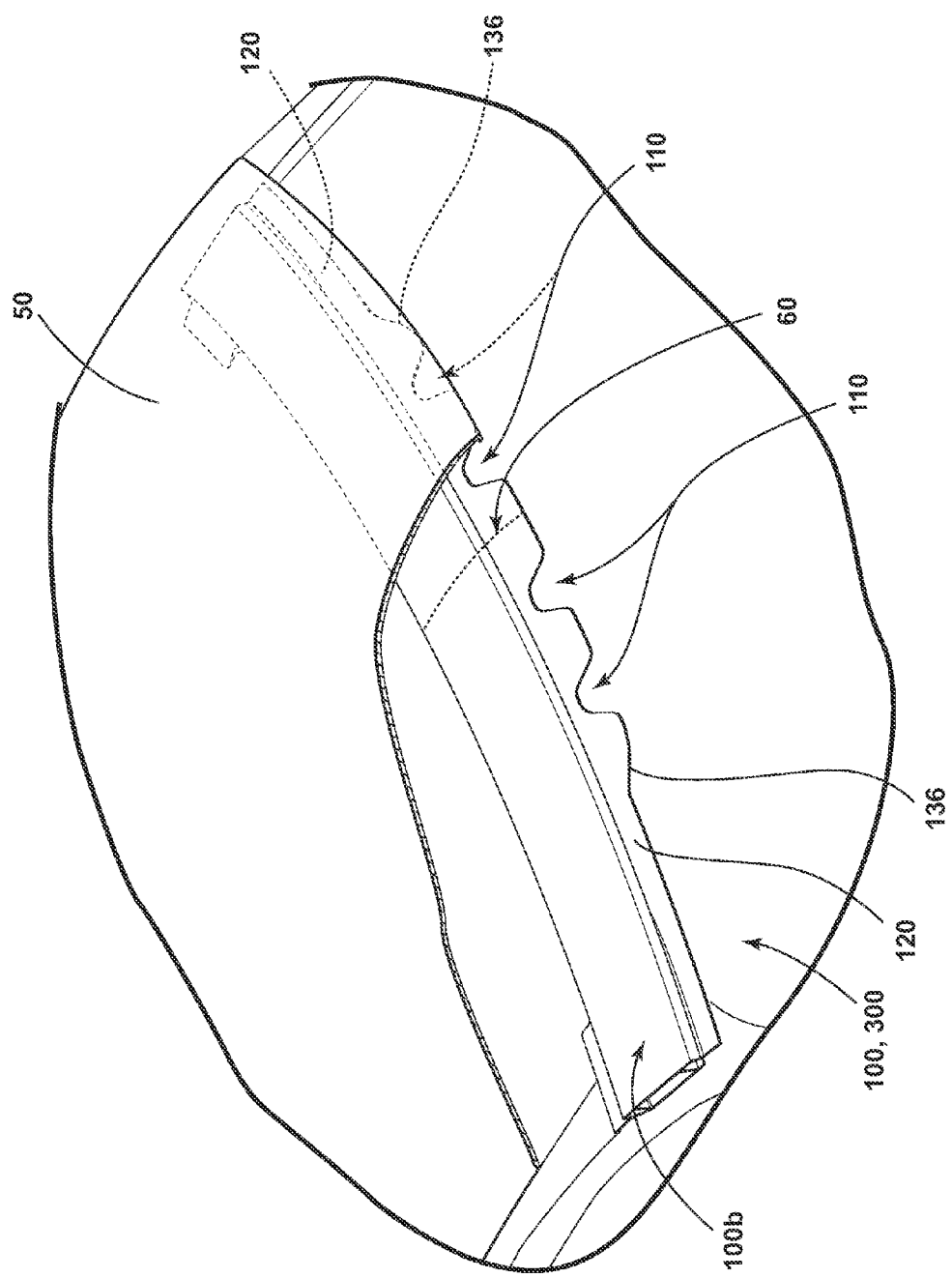

EXTRUDED BODY COMPONENT WITH NOTCHED FLANGE TO REDUCE STRAIN IN BENDING

CROSS-REFERENCE TO RELATED APPLICATION

This application is a continuation-in-part of U.S. patent application Ser. No. 14/062,510, filed on Oct. 24, 2013, entitled "HEADER BEAM OF A VEHICLE FRAME AND METHOD OF FORMING THE SAME," and U.S. patent application Ser. No. 14/062,568, filed on Oct. 24, 2013, entitled "HEADER BEAM OF A VEHICLE FRAME AND METHOD OF FORMING THE SAME." The aforementioned related applications are hereby incorporated by reference.

FIELD OF THE INVENTION

The present invention generally relates to vehicular subassemblies and body components suitable for bending processes, particularly hollow roof header members amenable to stretch bending manufacturing processes.

BACKGROUND OF THE INVENTION

Bending, stamping, stretch bending and other metal forming processes are used in the vehicle industry to shape precursor components into final or near-final component shapes. Often, these processes produce significant strain in precursor components fabricated from metals and metal alloys, e.g., hollow body members. As such, the precursor components should be designed to accommodate the strain associated with final manufacturing processes, and the engineering considerations associated with the particular final component in service. There is therefore a need to develop design features and processes in consideration of these strain-inducing manufacturing technologies, particularly as employed for hollow vehicle members.

SUMMARY OF THE INVENTION

According to one aspect of the present invention, a vehicular subassembly is provided. The vehicular subassembly includes a substantially hollow member having a long axis, a short axis, and an outer surface substantially parallel to the long axis. The outer surface includes a plurality of notched elements configured to reduce strain from bending the member in the direction of the short axis.

According to another aspect of the present invention, a vehicular subassembly is provided. The vehicular subassembly includes a substantially hollow member having a long axis, a short axis, and an outer surface that is curved substantially in the direction of the short axis. The outer surface is substantially in tension and curved from a stretch bending process. In addition, the outer surface includes a plurality of notched elements configured to reduce strain from the stretch bending process.

According to a further aspect of the present invention, a method of making a vehicular assembly is provided. The method includes the steps: providing a substantially hollow member having a long axis, a short axis, and an outer surface substantially parallel to the long axis; cutting a plurality of notched elements into the outer surface; and bending the member such that the portion of the outer surface in proximity to the notched elements is in tension and curved in the short axis direction.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 2A is a cut-away, enlarged view of a roof header assembly with notched elements beneath a roof element as depicted in FIG. 1;

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one with ordinary skill in the art to variously employ the present invention.

Figure 1:
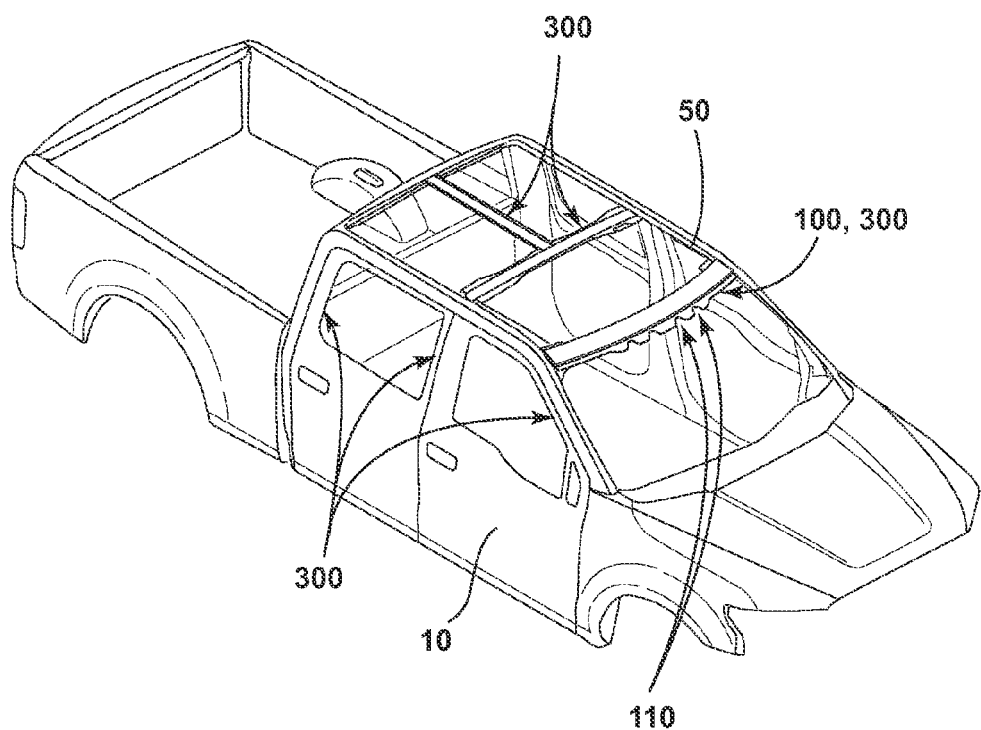
FIG. 1 is a perspective view of a vehicle containing a roof header assembly with notched elements configured to reduce bending strain according to one embodiment.

For purposes of description herein, the terms "upper," "lower," "right," "left," "rear," "front," "vertical," "horizontal," and derivatives thereof shall relate to the vehicle and components illustrated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
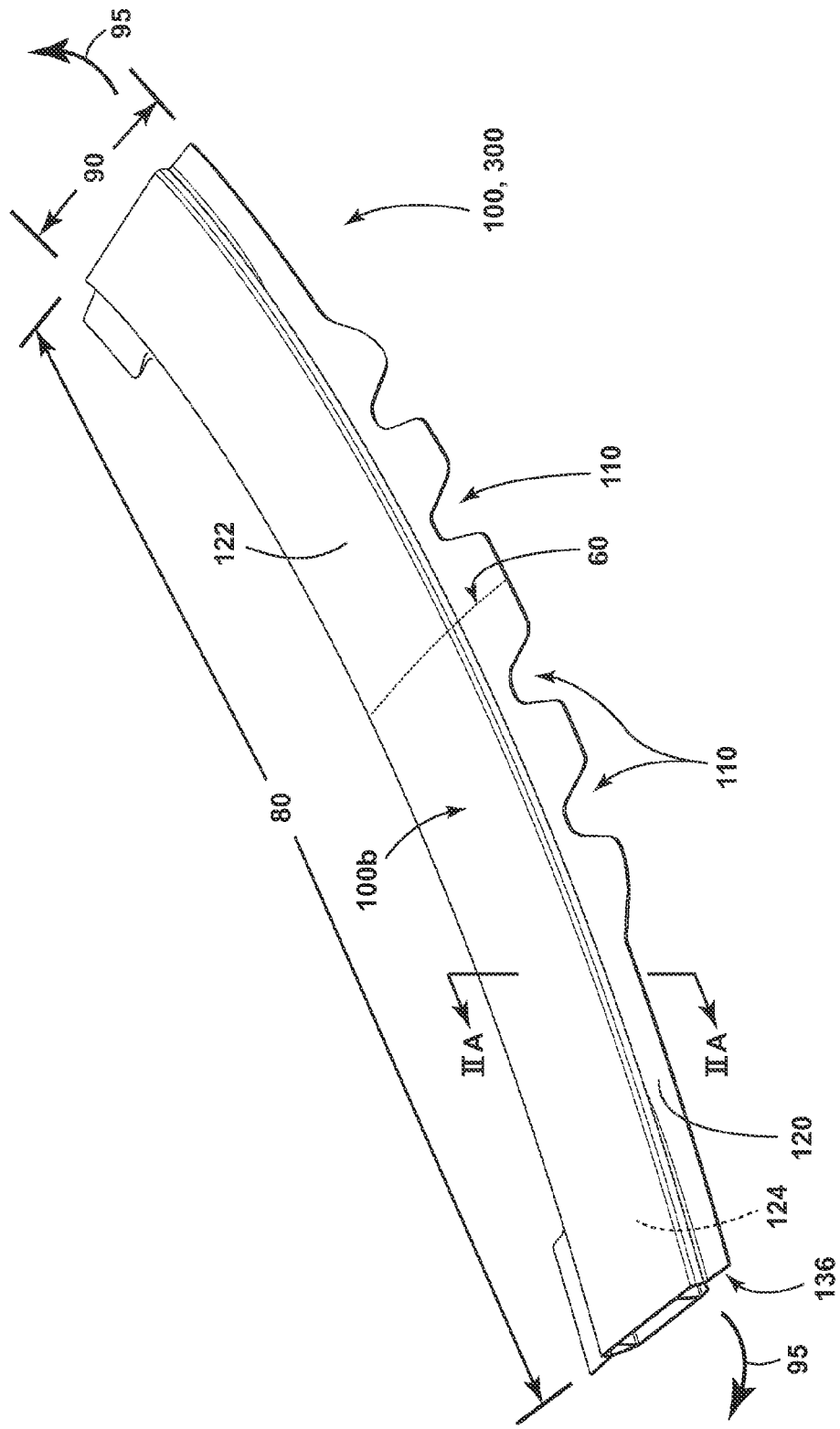
FIG. 2 is a perspective view of the roof header assembly with notched elements depicted in FIG. 1.

Referring to FIG. 1, reference numeral 300 generally designates a vehicular subassembly (e.g., a sun roof header element, A-pillar, B-pillar, C-pillar, roof header, etc.) and reference numeral 100 generally designates a roof header, as an exemplary vehicular subassembly, for the roof element 50 of a vehicle 10. The roof header 100 typically comprises a substantially hollow member (e.g., hollow member 100*b* as depicted in FIG. 2), configured to support a front portion of roof element 50. The roof header 100 may be fabricated from any materials capable of being manufactured through bending, flexing and stretch bending processes. Preferably, roof header 100 is fabricated from an aluminum alloy, such as a 6000 series extruded aluminum alloy. For example, header 100 can be fabricated from a 6082-T4 extruded alloy, tempered to a T6 condition after fabrication.

As shown in FIGS. 2, 2A, the roof header 100 (as an exemplary vehicular subassembly 300) includes a hollow member 100b, a long axis 80, a short axis 90 and an outer surface 120 substantially parallel to the long axis 80. The outer surface 120 may include notched elements 110 (see also FIG. 1), each configured to reduce strain associated with bending forces 95 applied to the header 100 in the direction of the short axis 90. It should be understood that additional bending forces (not shown) may also be applied to header 100 in other directions. For example, additional bending forces could be applied to the header 100 in the thickness direction, resulting in curvature on the upper-most surface 122 of the header 100. Such curvature could be employed to accommodate a like-curved roof element 50 above the upper-most surface 122.

The outer surface 120 may also include a flange 136, configured with the notched elements 110 as shown in FIGS. 2, 2A. Flange 136 may be a tongue-like feature that emanates from the body of the roof header 100 in the direction of the short axis 90. The flange 136 can serve to provide additional support for a frontal edge of roof element 50 (see FIGS. 1, 2A), particularly for designs of vehicle 10 having a roof element 50 with a feature that extends into the windshield region.

The notched elements 110 depicted in FIGS. 2, 2A may have a variety of shapes, provided that the selected shape reduces strain in the roof header 100 when the header 100 is subjected to a process that applies a bending force 95 generally in the direction of the short axis 90. The notched elements 110 have the effect of reducing the width of the header 100 in the direction of the short axis 90 at the location of the notches. Bending strains associated with bending forces 95, particularly on the outer surface 120 of the header 100, decrease as a function of decreasing width of the header 100.

As also shown in FIGS. 2, 2A, the notched elements 110 can be arranged symmetrically on either side of the centerline 60 along the long axis 80 of the roof header 100. In particular, two notched elements 110, spaced equally apart, are located on one side of the centerline 60 and two notched elements 110 are located on the other side of the centerline 60. Other configurations are possible with one to any number of notched elements 110 on either side of the centerline 60. The number, location and shape of notched elements 110 can be limited by the length of long axis 80 and the particular need for strain relief associated with the contemplated stretch bending, flexing or other part fabrication processes. Preferably, the notched elements 110 have smooth surfaces and large radii to reduce the likelihood of any localized stress concentration-related fatigue effects.

Figure 3A:
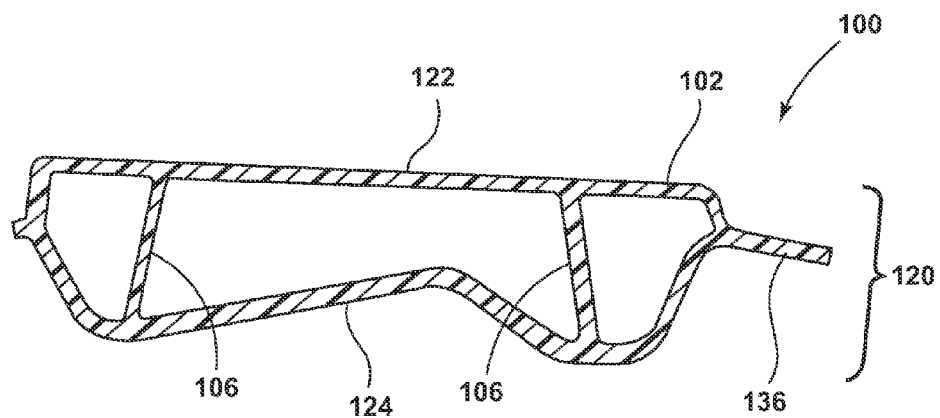
FIG. 3A is a cross-sectional view of the roof header assembly with notched elements depicted in FIG. 1.

Referring now to FIG. 3A, a cross-section 102 of the roof header 100 is depicted that demonstrates that the header 100 is substantially hollow. In the particular aspect depicted in FIG. 3A, the cross-section 102 is substantially quadrilateral or, more preferably, substantially rectangular in shape. Two ribs 106 are configured within the hollow cavity of header 100 and support the upper-most surface 122 and lower-most surface 124 of the header 100. The presence of ribs 106 as shown in FIG. 3A, creates three primary cavities within header 100. Preferably, the ribs 106 are angled as shown to provide additional support for the upper-most surface 122 during stretch bending, flexing or other part fabrication processes used to form the header 100. The angled nature of ribs 106 also serves to maximize available area on the central portion 124 that can be used for the attachment of other components in vehicle 10 (see FIG. 1) to the header 100 (e.g., A-pillars, B-pillars, etc.). Again referring to FIG. 3A, one or more ribs 106 can be configured within header 100 in consideration of the final design shape of the header 100, support needed for roof element 50 and support needed for the header 100 during part forming processes, and other engineering considerations.

Figure 3B:
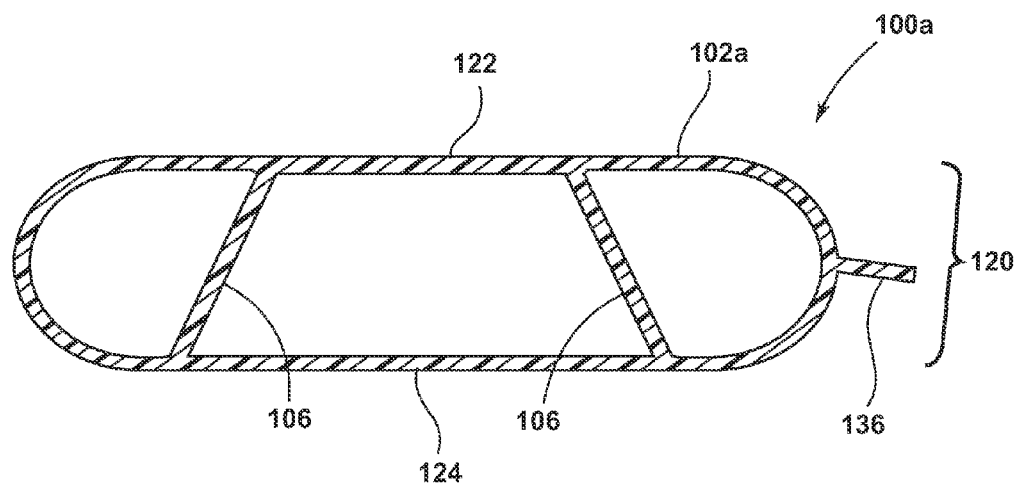
FIG. 3B is a cross-sectional view of a roof header assembly with notched elements and a substantially oval-shaped cross-section according to another embodiment.

In FIG. 3B, the cross-section 102a of a roof header 100a is depicted with a substantially oval shape. Roof header 100a is similar to roof header 100, differing only in its cross-sectional shape. The oval-shaped cross-section 102a possesses an outer surface 120 containing notched elements 110 (not shown). Even more preferably, a flange 136 will be configured to emanate from the outer surface 120 in a tongue-like shape, with the flange 136 containing the notched elements 110.

The roof header 100 depicted in FIGS. 1-3B is exemplary of other types of vehicular subassemblies 300 (see FIGS. 1-2) that can be fabricated according to other aspects of the present invention. As such, other vehicular subassemblies 300 (see FIGS. 1-2) can be employed based on the foregoing teachings in which the subassemblies have a substantially hollow member (e.g., the hollow member 100b is configured as a roof header 100, as depicted in FIG. 2), a long axis (e.g., long axis 80), a short axis (e.g., short axis 90), and an outer surface substantially parallel to the long axis (e.g., outer surface 120). These other vehicular subassemblies are further defined such that their outer surface features (e.g., outer surface 120) include a plurality of notched elements (e.g., notched elements 110) configured to reduce strain associated with bending the assembly in the direction of the short axis (e.g., short axis 90). For example, these subassemblies can include, but are not limited to, vehicular bumper elements, sun roof header elements, A-pillars, B-pillars, C-pillars, etc.). In particular, these subassemblies may be stretch formed, flexed, stamped, pressed, or otherwise machined in a fashion that can provide significant strain on some of their features. Given that these subassemblies experience significant strain associated with their manufacturing into a final part form, notched elements (e.g., notched elements 110) integrated into their surfaces, particularly surfaces that will be placed in tension from such part-forming processes, provide significant advantages in terms of strain reduction.

Figure 4:
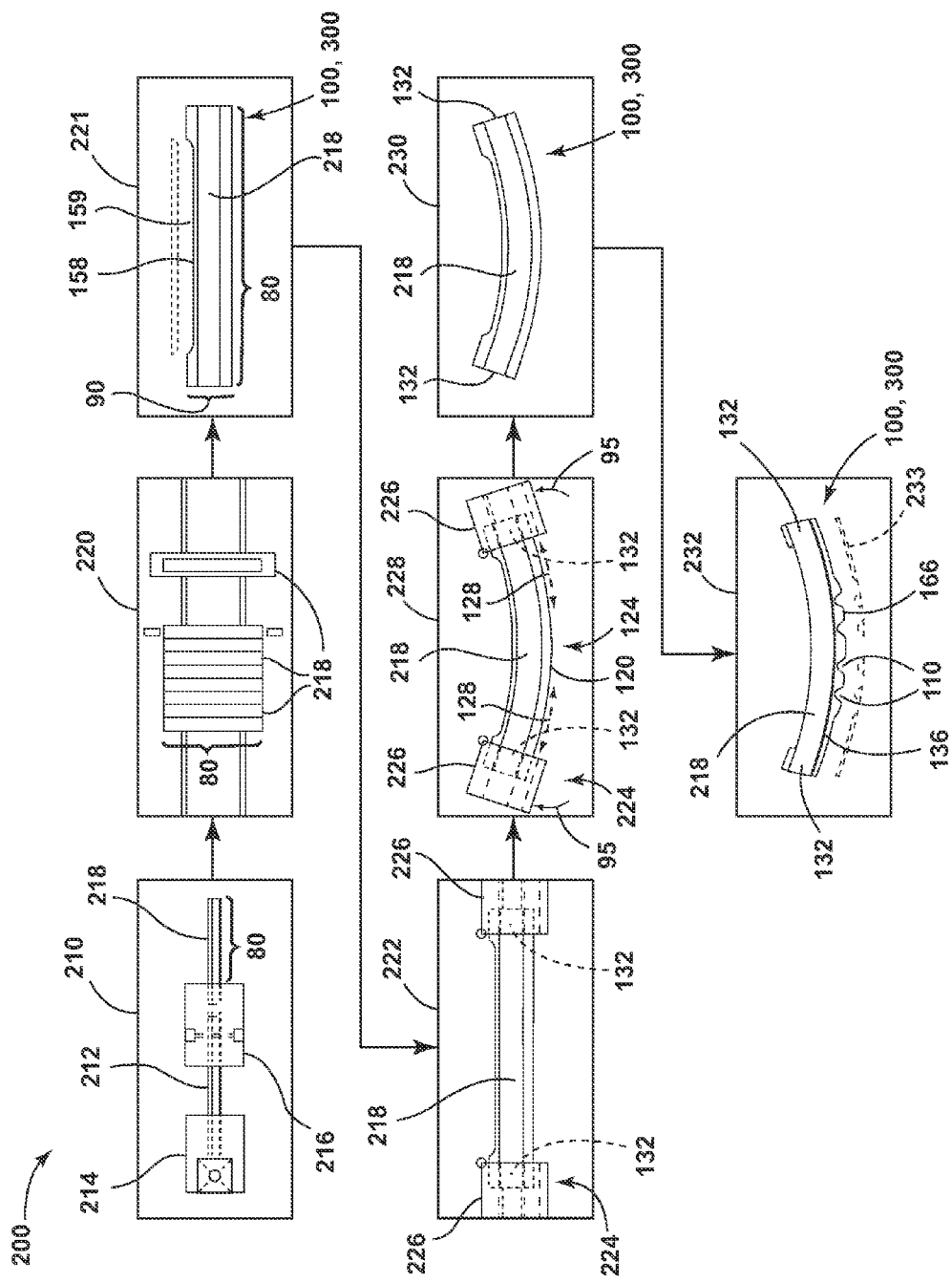
FIG. 4 is a flowchart showing a method of forming a roof header assembly according to a further embodiment.

Referring now to FIG. 4, a flowchart illustrates one embodiment of a method of forming 200 for a roof header 100, or vehicular subassembly 300, including steps 210 through 232. At step 210, a continuous beam 212 is extruded from an extrusion die 214. The continuous beam 212 is cut at a cutting station 216 to form a beam segment 218 with ends generally perpendicular to the long axis 80 of the beam segment 218. The beam segments 218 are then accumulated in stacks for transportation. The continuous beam 212 and, therefore, the roof header 100 of the illustrated embodiment is extruded primarily from aluminum or an aluminum alloy, although it is understood that additional and alternative materials may be used to form the roof header 100. It is also contemplated that the roof header 100, or portions thereof, may be formed from alternative metals and, alternatively, may be roll formed, hydroformed, or alternatively joined, such as by laser or arc welding.

The beam segments 218, as shown at step 220 of FIG. 4, are unstacked, measured, and centered on a conveyor, each becoming a precursor to the final roof header 100 component (see steps 230 and 232). The conveyor feeds the beam segments 218 to a trimming station, depicted in step 221, where the rear flange 158 of the roof header 100 that extends continuously along the long axis 80 of the beam segment 218 is trimmed. More specifically, the rear flange 158 is cut, stamped, or otherwise machined to form an elongated cutout 159 that defines rearward projections of the rear flange 158 proximate the end portions 132 (see step 222) of the beam segment 218 and, ultimately, header 100.

As also shown in FIG. 4, at step 222, the end portions 132 of the beam segment 218 are clamped with a bending device 224 that securely attaches to the end portions 132 of the beam segment 218. The bending device 224 in the illustrated embodiment has two clamping units 226 that clamp the end portions 132 equally to center the beam segment 218 between the two clamping units 226.

At step 228, the bending device 224 moves the clamping units 226 in generally opposite, rotational directions to generate bending forces 95 (e.g., rotational forces) that stretch bend the central portion 124 of the beam segment 218 to produce curvature 128 in the surfaces, including the outer surface 120, of the header 100. For example, the beam segment 218 (i.e., the precursor for header 100) can be subjected to a stretch bending procedure in a direction substantially oriented along its short axis 90 (see step 221).

In some embodiments, the bending device 224 can be configured to stretch bend the beam segment 218 in three dimensions, such that the rear flange 158 undergoes some compression, and the central portion 124 and the outer surface 120 are placed in tension from the process. However, the elongated cutout 159 in the rear flange 158 significantly reduces compression in the rear flange 158 to prevent buckling or undesirable curvature during the stretch bending process. It is understood that in additional embodiments, the bending device 224 may have one clamping unit 226 that moves relative to a stationary clamping unit 226 to stretch and bend the beam segment 218 to the desired curvature in the exterior surfaces of header 100. The clamping units 226 are released from the beam segment 218 in step 230, and the end portions 132 of the beam segment 218 remain generally straight, as previously described.

Still referring to FIG. 4, at step 232, a press with a cutting die 233 strikes the front flange 136 of the beam segment 218 with a pattern that provides generally uniform front edges 166 of the front flanges 136 across production of multiple beam segments 218. More specifically, the front flange 136 is struck to form the front edge 166 that is parallel to the curvature 128 proximate the end portions 132 of the beam for engaging the windshield (not shown).

Still referring to FIG. 4, the cutting die 233 also forms the series of notched elements 110 on the outer surface 120 comprising the front flange 136 to reduce tension (and relieve strain) in the front flange 136 caused by the stretch bending process and to provide points of connection for roof element 50 (not shown). As noted earlier, the notched elements 110 interface with the roof element 50 (see FIG. 1) to also provide an area to relieve fluid buildup between the front flange 136 and the roof element 50, such as during the painting process of the vehicle 10 (see FIGS. 1 and 2A) or from weather-related precipitation. Further, cutting the notched elements 110 in the front flange 136 also provides a weight savings in the header 100, while not detrimentally affecting the additional load bearing capacity offered by the front flange 136 of the header 100. It should be understood that other procedures besides die cutting may be employed to form the notched elements 110, including stamping, laser cutting, water cutting and other machining processes as readily understood by those with ordinary skill in the art.

In another alternative embodiment, the aspects of step 232 shown in FIG. 4 related to cutting notched elements 110 from front flange 136 are conducted in step 221. In this alternative procedure according to method 200, step 232 is deleted. Otherwise, the method 200 for forming the roof header 100 proceeds in the same manner. When the notched elements 110 are cut from the front flange 136 in step 221, the subsequent stretch bending process of step 228 is conducted with greater ease. The removal of material associated with notched elements 110 tends to reduce the overall thickness of beam segment 218, thus reducing the overall strain associated with the stretch bending process of step 228.

The roof header 100 and the other vehicular subassemblies described in the foregoing possess several advantageous features. Notably, the notched elements 110 of the roof header 100 and the foregoing vehicular subassemblies significantly reduce strain associated with manufacturing processes for the header 100 itself. The notched elements 110 also provide some weight savings, which can translate into some fuel efficiency improvements for the vehicle 10. Still further, in some embodiments, the notched elements 110 can be carefully configured beneath roof element 50 to facilitate water drainage from rain and other precipitation. In addition, the notched elements 110 can provide a means for paint drainage during and after e-coating and other painting processes used to deploy paint and other coating features on the roof element 50, header 100 and other vehicular components in proximity to the roof element 50 and header 100.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicular subassembly, comprising:
a roof header comprising a substantially hollow member having a long axis, a short axis, and an outer surface that is curved from a stretch bending process in the direction of the short axis,
wherein the outer surface is substantially in tension, and
further wherein the outer surface includes a tongue element and a plurality of notched elements configured on the element to reduce strain from the stretch bending process.

2. The vehicular subassembly of claim 1, wherein the hollow member further comprises a quadrilateral cross-section.

3. The vehicular subassembly of claim 1, wherein the hollow member further comprises a substantially oval-shaped cross-section.

4. The vehicular subassembly of claim 1, wherein the hollow member comprises an aluminum alloy.

* * * * *